US012338655B2

(12) United States Patent
Von Matern

(10) Patent No.: US 12,338,655 B2
(45) Date of Patent: Jun. 24, 2025

(54) ACTUATING DEVICE AND LOCK DEVICE

(71) Applicant: ASSA ABLOY AB, Stockholm (SE)

(72) Inventor: Johan Von Matern, Täby (SE)

(73) Assignee: ASSA ABLOY AB, Stockholm (SE)

( * ) Notice: Subject to any disclaimer, the term of this patent is extended or adjusted under 35 U.S.C. 154(b) by 269 days.

(21) Appl. No.: 17/794,544

(22) PCT Filed: Jan. 14, 2021

(86) PCT No.: PCT/EP2021/050727
§ 371 (c)(1),
(2) Date: Jul. 21, 2022

(87) PCT Pub. No.: WO2021/148309
PCT Pub. Date: Jul. 29, 2021

(65) Prior Publication Data
US 2023/0058299 A1 Feb. 23, 2023

(30) Foreign Application Priority Data
Jan. 23, 2020 (SE) .................................... 2050065-8

(51) Int. Cl.
*E05B 47/06* (2006.01)
*E05B 47/00* (2006.01)

(52) U.S. Cl.
CPC ........ *E05B 47/068* (2013.01); *E05B 47/0615* (2013.01); *E05B 2047/0062* (2013.01); *E05B 2047/0065* (2013.01); *E05B 47/063* (2013.01)

(58) Field of Classification Search
CPC ............... E05B 47/068; E05B 47/0615; E05B 2047/0062; E05B 2047/0065;
(Continued)

(56) References Cited

U.S. PATENT DOCUMENTS 6,370,928 B1 4/2002 Chies et al.
6,867,685 B1 * 3/2005 Stillwagon .............. E05B 5/003 292/341.16
(Continued)

FOREIGN PATENT DOCUMENTS

CN 103334644 A * 10/2013 ......... E05B 47/0615
CN 105735787 7/2016
(Continued)

OTHER PUBLICATIONS

Official Action for Sweden Patent Application No. 2050065-8, dated Sep. 16, 2020, 8 pages.
(Continued)

*Primary Examiner* — Kristina R Fulton
*Assistant Examiner* — Faria F Ahmad
(74) *Attorney, Agent, or Firm* — Schwegman Lundberg & Woessner, P.A.

(57) ABSTRACT

An actuating device (12) comprising an actuating element (14); an electric generator (16); and an electromechanical coupling device (18) configured to adopt a decoupled state, for decoupling the actuating element (14) from a locking member (22), and a coupled state, for coupling the actuating element (14) to the locking member (22); wherein the coupling device (18) comprises a blocker (26), a holder (38) and a release mechanism (40); wherein the holder (38) is arranged to adopt a holding position, in which the holder (38) holds the blocker (26), when the coupling device (18) adopts the coupled state; wherein the holder (38) is arranged to adopt a released position, in which the holder (38) does not hold the blocker (26), when the coupling device (18) adopts the decoupled state; and wherein the release mechanism (40) is arranged to mechanically force the holder (38) from the holding position to the released position by manual
(Continued)

rotation of the actuating element (14) about the actuating axis (20).

15 Claims, 6 Drawing Sheets

(58) Field of Classification Search
CPC ............. E05B 47/0657; E05B 47/0661; E05B 47/0603; E05B 47/063; E05B 47/0623
See application file for complete search history.

(56) References Cited

U.S. PATENT DOCUMENTS

| | | | | |
|---|---|---|---|---|
| 6,913,413 | B2 * | 7/2005 | Yang | F16B 21/18 403/321 |
| 7,640,773 | B2 * | 1/2010 | Bellamy | E05B 47/0653 70/416 |
| 7,698,916 | B2 * | 4/2010 | Davis | E05B 47/063 70/386 |
| 8,459,071 | B2 * | 6/2013 | Andersson | E05B 47/0661 70/210 |
| 8,534,102 | B2 * | 9/2013 | Andersson | E05B 47/063 70/278.3 |
| 8,973,417 | B2 * | 3/2015 | Bench | E05B 9/086 70/278.1 |
| 10,443,269 | B2 * | 10/2019 | Piirainen | H02K 49/104 |
| 11,655,653 | B1 * | 5/2023 | Zhang | E05B 9/08 70/277 |
| 2002/0095964 | A1 * | 7/2002 | Davis | E05B 15/0053 70/278.3 |
| 2004/0255628 | A1 * | 12/2004 | Meyerle | E05B 47/068 70/422 |
| 2006/0032278 | A1 * | 2/2006 | Lin | E05B 47/0603 70/240 |
| 2009/0013736 | A1 * | 1/2009 | Voosen | E05C 1/12 70/277 |
| 2012/0297842 | A1 * | 11/2012 | Gartner | E05B 63/0017 70/278.1 |
| 2014/0165678 | A1 | 6/2014 | Burrus et al. | |
| 2016/0189456 | A1 | 6/2016 | Cumbo et al. | |
| 2016/0326774 | A1 | 11/2016 | DeHaven et al. | |
| 2020/0149320 | A1 * | 5/2020 | Pfunder | E05B 17/2011 |
| 2020/0190859 | A1 * | 6/2020 | Green | E05B 47/0623 |
| 2020/0270904 | A1 * | 8/2020 | Lee | E05B 17/10 |
| 2021/0301558 | A1 * | 9/2021 | Lee | G07C 9/00174 |

FOREIGN PATENT DOCUMENTS

| | | | | |
|---|---|---|---|---|
| CN | 108350704 | | 7/2018 | |
| DE | 10115074 | A1 * | 10/2002 | E05B 47/063 |
| DE | 10305419 | B3 * | 9/2004 | E05B 47/063 |
| DE | 102004056988 | | 6/2006 | |
| DE | 102006012196 | B3 * | 8/2007 | E05B 47/063 |
| DE | 102014105432 | | 10/2015 | |
| DE | 102015111937 | A1 * | 3/2016 | E05B 47/0615 |
| DE | 102017111353 | A1 * | 11/2018 | |
| EP | 0462316 | | 12/1991 | |
| EP | 1380714 | A2 * | 1/2004 | E05B 47/063 |
| EP | 2287424 | A2 * | 2/2011 | E05B 47/063 |
| EP | 2453083 | A2 * | 5/2012 | E05B 47/063 |
| EP | 2821568 | A2 | 1/2015 | |
| EP | 2821568 | A3 | 3/2015 | |
| EP | 3168393 | | 5/2018 | |
| EP | 3533956 | | 9/2019 | |
| EP | 3533956 | A1 * | 9/2019 | E05B 15/0033 |
| WO | WO-2018156024 | A1 * | 8/2018 | E05B 13/005 |
| WO | WO 2018/184070 | | 10/2018 | |
| WO | 2021148309 | | 7/2021 | |

OTHER PUBLICATIONS

International Search Report and Written Opinion for International (PCT) Patent Application No. PCT/EP2021/050727, dated Mar. 24, 2021, 14 pages.
Official Action with English Translation for China Patent Application No. CN 202180010789.7, dated Feb. 18, 2023, 11 pages.
Official Action for Sweden Patent Application No. 2050065-8, dated Sep. 13, 2021, 5 pages.
Official Action for Sweden Patent Application No. 2050065-8, dated Nov. 29, 2022, 5 pages.
"International Application Serial No. PCT EP2021 050727, International Preliminary Report on Patentability mailed Aug. 4, 2022", 8 pgs.

* cited by examiner

ACTUATING DEVICE AND LOCK DEVICE

CROSS REFERENCE TO RELATED APPLICATIONS

This application is a national stage application under 35 U.S.C. 371 and claims the benefit of PCT Application No. PCT/EP2021/050727 having an international filing date of Jan. 14, 2021, which designated the United States, which PCT application claimed the benefit of Sweden Patent Application No. 2050065-8 filed Jan. 23, 2020, the disclosure of each of which are incorporated herein by reference.

TECHNICAL FIELD

The present disclosure generally relates to an actuating device. In particular, an actuating device for a lock device and a lock device comprising an actuating device, are provided.

BACKGROUND

Some electromechanical lock devices comprise a rotatable locking member, a rotatable knob and an electromechanical coupling device for selectively coupling the knob to the locking member. When a user has presented his/her credential(s) and has been authorized, the coupling device adopts a coupled state in which the knob and the locking member are coupled and the lock device can be unlocked by turning the knob. The lock device can thus be unlocked when the coupling device adopts the coupled state. An access member, such as a door, can then be opened by the user. When the user closes the access member (e.g. upon leaving a building) and wants to lock the same, the user again presents his/her credential(s) and the coupling device again adopts the coupled state. The user can then turn the knob in the opposite direction to lock the lock device.

When authorization of the user is denied, the coupling device does not couple the knob and the locking member. Thus, the coupling device remains in a decoupled state in which rotation of the knob is not transmitted to a rotation of the locking member. The lock device therefore ideally cannot be unlocked when the coupling device adopts the decoupled state.

Some such electromechanical coupling devices comprise a blocker movable between an extended state and a retracted state, a spring forcing the blocker towards the extended state, and a holder (e.g. driven by an electric holder motor) for selectively holding the blocker in the extended state. When the coupling device adopts the decoupled state (locked lock device), the holder should not hold the blocker. Rotation of the knob eventually causes the blocker to contact a protrusion of the locking member. If the holder does not hold the blocker, further rotation of the knob causes the blocker to be pushed from the extended state to the retracted state against the force of the spring when the blocker passes the protrusion. The locking member therefore cannot be rotated by rotation of the knob.

When the coupling device adopts the coupled state (unlocked lock device), the holder however holds the blocker. Rotation of the knob eventually causes the blocker to contact the protrusion of the locking member. Since the holder now holds the blocker, further rotation of the knob is transmitted to a rotation of the locking member.

DE 102014105432 A1 discloses an electromechanical lock cylinder comprising a cylinder housing, a knob, a clutch and an electromotor working as a generator.

SUMMARY

When the user of the above described lock device (comprising an electromechanical coupling device having a blocker, a spring and a holder) has finished the common rotation of the knob and the locking member to lock the lock device, there is a risk that the blocker and holder remain under tension when the user releases his/her grip of the knob. That is, the knob might be left in a rotational position where the blocker remains in engaging contact with the protrusion and thereby pushes the holder such that the holder cannot be brought back to its released position, even if attempted to do so by means of the electric holder motor. In this state of the lock device, there is a risk that the locking member can be rotated by the knob.

For a battery powered lock device, this problem may be addressed by making an electric knob motor drive the knob to a non-tensioned state, i.e. a position where the blocker is no longer in contact with the protrusion. To this end, small magnets may be provided to rotate the knob. With a battery powered lock device, the electric holder motor may be driven later. That is, the electric holder motor may drive the holder from a holding position to a released position after the electric knob motor has driven the knob to the non-tensioned state.

However, for an energy harvesting lock device where the coupling device is electrically powered by an electric generator, which in turn is driven by manual rotation of the knob, energy for bringing the knob to a non-tensioned state may not always be available after stopping rotation of the knob. One reason for this may be that the knob of an energy harvesting lock device is heavier to rotate than the knob of a battery powered lock device. Thus, the knob may be too heavy to rotate by small magnets in the lock device.

One object of the present disclosure is to provide an actuating device for a lock device, which actuating device has improved security.

A further object of the present disclosure is to provide an actuating device for a lock device, which actuating device has a simple design.

A still further object of the present disclosure is to provide an actuating device for a lock device, which actuating device has a reliable design.

A still further object of the present disclosure is to provide an actuating device for a lock device, which actuating device solves several or all of the foregoing objects in combination.

A still further object of the present disclosure is to provide a lock device comprising an actuating device, which lock device solves one, several or all of the foregoing objects.

According to one aspect, there is provided an actuating device for a lock device, the actuating device comprising an actuating element manually rotatable about an actuating axis; an electric generator arranged to be driven by manual rotation of the actuating element about the actuating axis; and an electromechanical coupling device arranged to be electrically powered by the electric generator, the coupling device being configured to adopt a decoupled state, for decoupling the actuating element from a locking member, and a coupled state, for coupling the actuating element to the locking member; wherein the coupling device comprises a blocker, a holder and a release mechanism; wherein the holder is arranged to adopt a holding position, in which the holder holds the blocker, when the coupling device adopts the coupled state;

wherein the holder is arranged to adopt a released position, in which the holder does not hold the blocker, when the coupling device adopts the decoupled state; and wherein the release mechanism is arranged to mechanically force the holder from the holding position to the released position by manual rotation of the actuating element about the actuating axis.

When the user rotates the actuating element, the release mechanism will force the holder from the holding position to the released position. Thus, should the blocker be left in contact with an engageable structure on the locking member after locking the lock device by rotation of the actuating element in a locking direction, the holder will be forced to the released position by the release mechanism during early rotation of the actuating element (prior to harvesting of sufficient energy) in an unlocking direction, opposite to the locking direction. The release mechanism thereby ensures that the coupling device is actually brought to the decoupled state, and not only commanded to the decoupled state. In this way, it is ensured that the locking member cannot be impermissibly rotated by the actuating element.

When sufficient energy has been harvested by the electric generator from rotation of the actuating element, and if the holder is moved to the holding position to make the coupling device adopt the coupled state (e.g. based on a granted authorization request), rotation of the actuating element will be transmitted by the blocker to a rotation of the locking member. When the actuating element and the locking member rotate in common, the release mechanism does not force the holder from the holding position to the released position. Thus, the release mechanism may be arranged to mechanically force the holder from the holding position to the released position by manual rotation of the actuating element about the actuating axis relative to the locking member.

The release mechanism forces the holder purely mechanically in response to rotation of the actuating element. Thus, should the holder be stuck in the holding position even if the holder is commanded to move to the released position, the holder will be forced away from the holding position by the release mechanism directly when the actuating element starts to rotate. Thereby, locking of the lock device is always guaranteed, even if there is no electric power available.

The release mechanism may be configured to directly contact the holder, for example by pushing, to force the holder from the holding position to the released position. In case the holder is in the released position, the holder may not be forced by the release mechanism when the actuating element is rotated. The holder may be constituted by a rigid body.

The coupling device is electrically powered by the electric generator when the electric generator is driven by rotation of the actuating element. When the actuating element is at rest, the coupling device may not be electrically powered.

The actuating element may be configured to be grasped and rotated by a human hand. The actuating element may for example be a knob or a lever handle.

The coupling device may comprise an electric motor arranged to be electrically powered by the electric generator, and the electric motor may be arranged to drive the holder from the released position to the holding position, e.g. in response to a granted authorization request. The electric motor is electrically powered by the electric generator when the electric generator is driven by rotation of the actuating element. When the actuating element is at rest, the electric motor may not be electrically powered.

The holder may be rotatable between the holding position and the released position about a motor axis of the electric motor, substantially parallel with, or parallel with, the actuating axis. Thus, in a first rotational position of the holder about the motor axis, the holder adopts the holding position, and in a second rotational position of the holder about the motor axis, the holder adopts the released position.

The holder may comprise an eccentric holder part, eccentric with respect to the motor axis and arranged to be engaged by the release mechanism. The eccentric holder part may be a pin.

The release mechanism may comprise a release member arranged to push the holder from the holding position to the released position by manual rotation of the actuating element about the actuating axis. The release member may be constituted by a rigid body.

The release member may comprise a cam surface arranged to engage the eccentric holder part. Thus, by rotating the actuating element, the eccentric holder part is forced to move along the cam surface such that the holder is forced from the holding position to the released position.

The release member may be arranged to reciprocate linearly with respect to the actuating element and substantially perpendicularly to, or perpendicularly to, the actuating axis, in response to manual rotation of the actuating element about the actuating axis. Alternatively, or in addition, the release member may rotate about the actuating axis when the actuating element rotates about the actuating axis.

The release member may comprise a slot arranged to be engaged by an eccentric locking member part of the locking member, eccentric with respect to the actuating axis. The eccentric locking member part may be a pin.

The blocker may comprise a blocking member. The blocking member may be constituted by a rigid body.

The blocking member may be arranged to adopt an engaged position when the coupling device adopts the coupled state, the blocking member may be allowed to move from the engaged position to a disengaged position, substantially parallel with, or parallel with, the actuating axis, when the coupling device adopts the decoupled state, and the coupling device may further comprise a blocker force device arranged to force the blocking member from the disengaged position towards the engaged position. The engaged position and the disengaged position may be an extended position and a retracted position, respectively, with respect to the actuating element. The blocker force device may be a spring, such as a compression spring. As a possible alternative, the blocker force device may comprise two repelling magnets.

The blocker may further comprise a guiding member having two guide surfaces. In this case, the blocking member may be arranged between the guide surfaces, and the guiding member may be allowed to move, substantially parallel with, or parallel with, the actuating axis, in response to manual rotation of the actuating element about the actuating axis, regardless of whether the coupling device adopts the coupled state or the decoupled state. Also the guiding member may be constituted by a rigid body.

By means of the blocker comprising the blocking member and the guiding member, the actuating device cannot be manipulated by overloading the actuating element. When the holder adopts the holding position, rotation of the actuating element will only cause axial movement of the guiding member, but not of the blocking member. To this end, the blocking member may comprise contact surfaces for engaging an engageable structure of the locking member, which contact surfaces each lies in a plane substantially parallel with, or parallel with, the actuating axis.

The actuating device may further comprise a blocking member force device arranged to force the blocking member relative to the guiding member. The blocking member force device may be a spring, such as a compression spring.

As a possible alternative, the blocking member force device may comprise two repelling magnets.

According to a further aspect, there is provided a lock device comprising an actuating device according to the present disclosure. The lock device may for example be a lock cylinder. In this case, the lock device constitutes a digital lock cylinder or an electromechanical lock cylinder. The lock device can replace various lock cylinders, for example a door lock, a padlock or a bike lock.

Since the electric generator can be driven by manually rotating the actuating element, the lock device may be said to constitute an energy harvesting lock device, such as an energy harvesting lock cylinder.

The lock device may further comprise the locking member, wherein the locking member can be moved from a locked position to an unlocked position by means of manual rotation of the actuating element about the actuating axis when the coupling device adopts the coupled state, and wherein the locking member cannot be moved from the locked position to the unlocked position by means of manual rotation of the actuating element about the actuating axis when the coupling device adopts the decoupled state. The locking member may be rotatable about the actuating axis.

The locking member may comprise an engageable structure arranged to be engaged by the blocker by manual rotation of the actuating element about the actuating axis. The engageable structure may be a protrusion.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
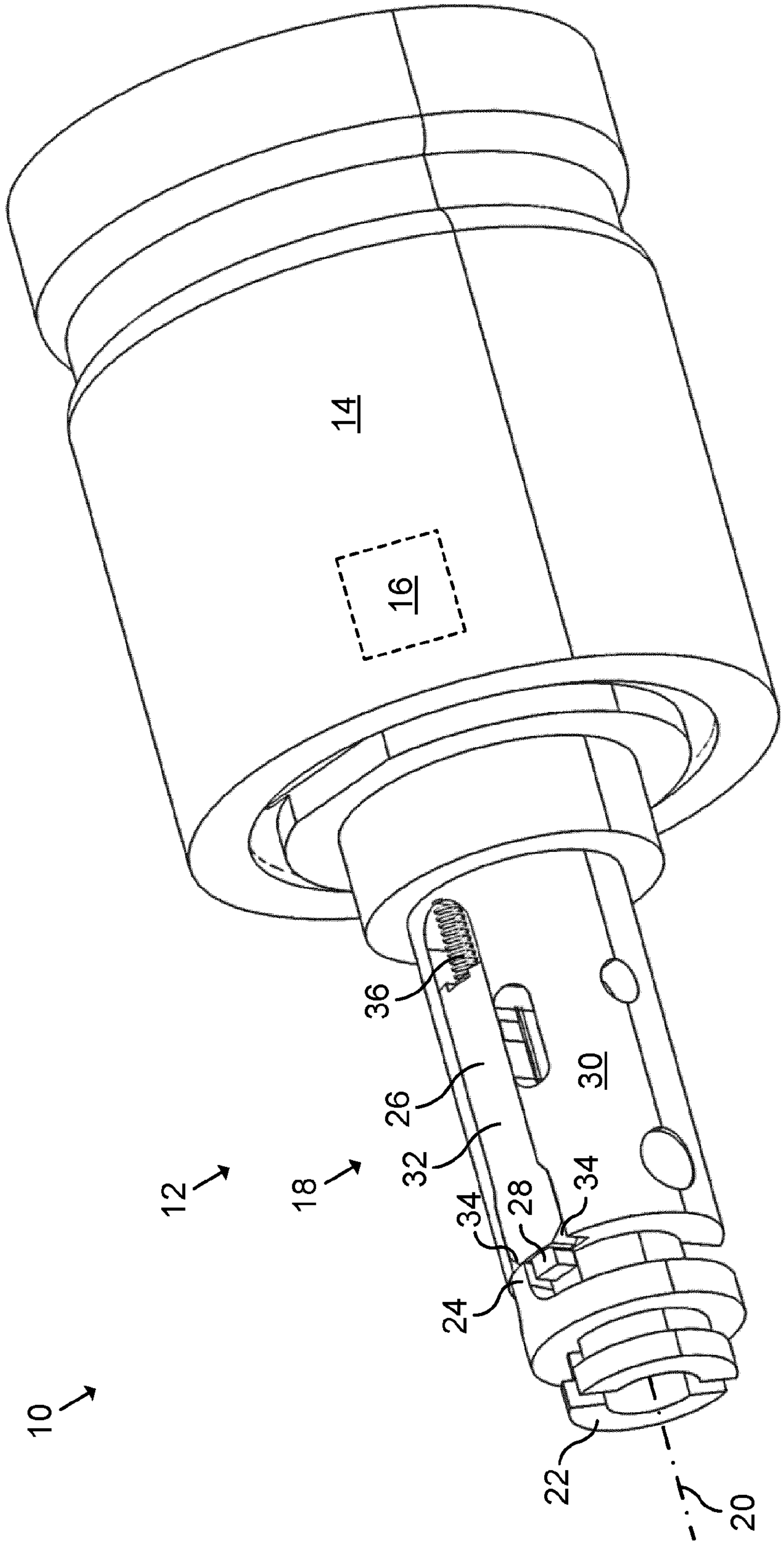
FIG. 1: schematically represents a perspective top view of a lock device comprising an actuating device.

In the following, an actuating device for a lock device and a lock device comprising an actuating device, will be described. The same or similar reference numerals will be used to denote the same or similar structural features.

FIG. 1 schematically represents a perspective top view of a lock device 10 comprising an actuating device 12. The lock device 10 of this example is an energy harvesting lock cylinder. The actuating device 12 comprises an actuating element 14, an electric generator 16 and an electromechanical coupling device 18.

The actuating element 14 can be grasped and rotated by a human hand about an actuating axis 20, e.g. relative to a stationary structure (not illustrated). The actuating element 14 is here exemplified as a knob.

The electric generator 16 is driven by the manual rotation of the actuating element 14. Thus, when the actuating element 14 rotates about the actuating axis 20, the electric generator 16 is rotationally driven by the actuating element 14 to generate electric energy.

The coupling device 18 is arranged to be electrically powered by the electric generator 16. Thus, when the electric generator 16 is driven by rotation of the actuating element 14 to generate electric energy, the electric generator 16 electrically powers the coupling device 18.

The lock device 10 further comprises a locking member 22. The locking member 22 is rotatable about the actuating axis 20, e.g. between a locked position and an unlocked position. The locking member 22 comprises an engageable structure, here exemplified as a protrusion 24.

The coupling device 18 is configured to adopt a decoupled state and a coupled state. In the decoupled state, the coupling device 18 does not transmit rotation of the actuating element 14 to rotation of the locking member 22. Thus, when the coupling device 18 adopts the decoupled state, the lock device 10 is locked and the locking member 22 cannot be rotated from the locked position to the unlocked position (and vice versa) by manual rotation of the actuating element 14.

In the coupled state, the coupling device 18 transmits rotation of the actuating element 14 to rotation of the locking member 22. Thus, when the coupling device 18 adopts the coupled state, the lock device 10 is unlocked and the locking member 22 can be rotated from the locked position to the unlocked position (and vice versa) by manual rotation of the actuating element 14. In FIG. 1, the coupling device 18 is in the coupled state.

The coupling device 18 comprises a blocker 26. The blocker 26 comprises a rigid blocking member 28. The blocking member 28 is arranged to adopt an engaged position when the coupling device 18 adopts the coupled state. Thus, in FIG. 1, the blocking member 28 is in the engaged position. When the coupling device 18 adopts the decoupled state, the blocking member 28 is allowed to adopt a disengaged position by linear movement parallel with the actuating axis 20.

As shown in FIG. 1, the protrusion 24 of the locking member 22 is engaged by the blocker 26. In this example, the engaged position is an extended position (the blocking member 28 extends to the left in FIG. 1) and the disengaged position is a retracted position.

The actuating device 12 further comprises a spindle 30. The spindle 30 of this example is fixedly connected to the actuating element 14. The blocking member 28 is arranged to move parallel with the actuating axis 20 in a slot in the spindle 30 between the engaged position and the disengaged position. The blocking member 28 comprises two contact surfaces, at the left end in FIG. 1. Each contact surface is configured to engage the protrusion 24 of the locking member 22. The contact surfaces each lies in a plane substantially parallel with the actuating axis 20.

The blocker 26 further comprises a guiding member 32. The guiding member 32 of this example is a rigid body. The guiding member 32 comprises two inclined and flat guide surfaces 34. As shown in FIG. 1, the blocking member 28 is arranged between the two guide surfaces 34. The guiding member 32 is allowed to move, parallel with the actuating axis 20, when the actuating element 14 rotates about the actuating axis 20, regardless of whether or not the coupling device 18 adopts the coupled state or the decoupled state.

The actuating device 12 further comprises a blocker force device, here exemplified as a spring 36. The spring 36 is arranged to force the guiding member 32 forward (to the left in FIG. 1) and to force the blocking member 28 from the disengaged position towards the engaged position. To this end, the spring 36 acts between the spindle 30 and the guiding member 32.

Figure 2:
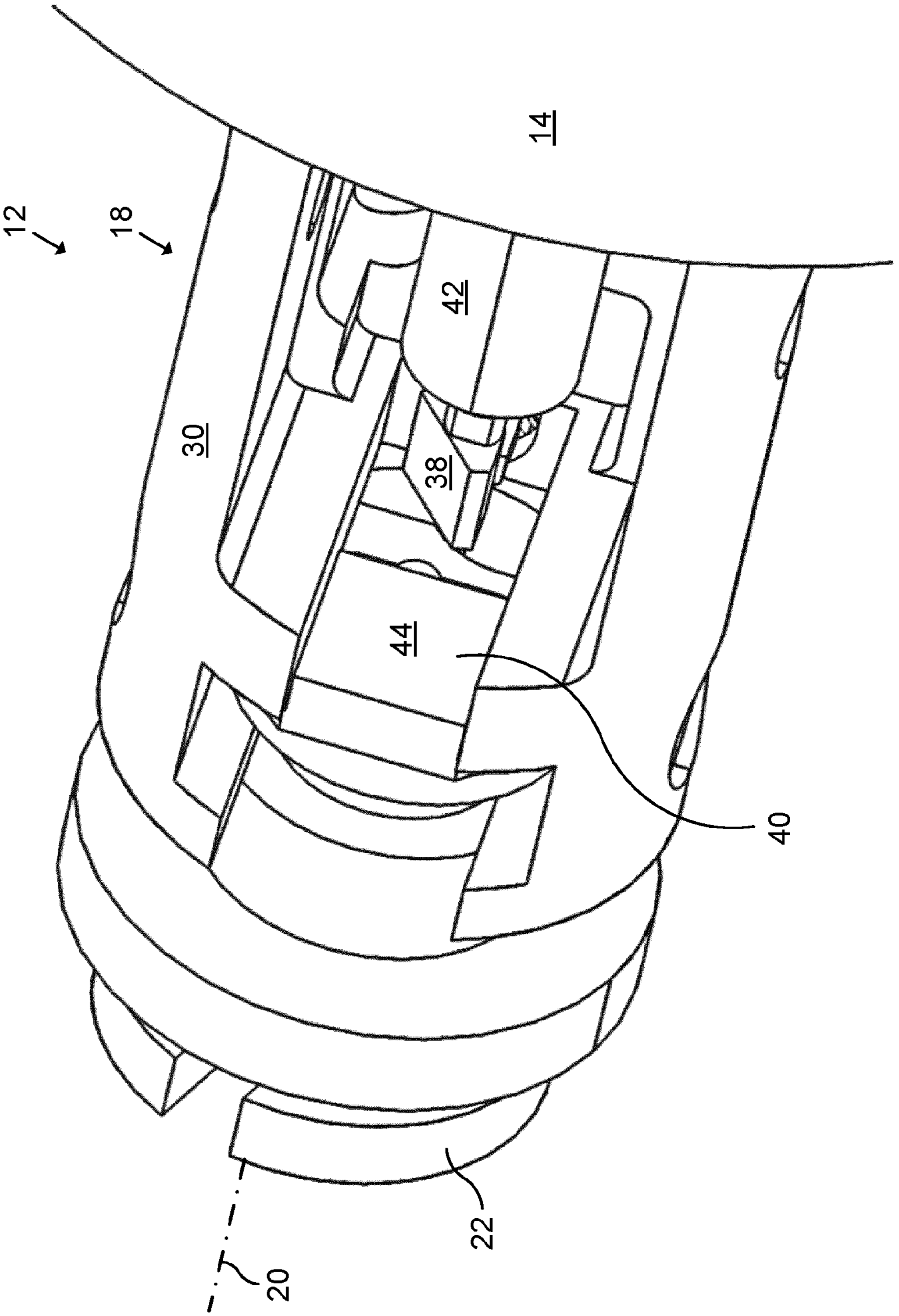
FIG. 2: schematically represents a partial perspective bottom view of the lock device.

FIG. 2 schematically represents a partial perspective bottom view of the lock device 10. In FIG. 2, it can be seen that the coupling device 18 further comprises a holder 38 and a release mechanism 40. The holder 38 is a rigid body.

The coupling device 18 further comprises an electric motor 42. The electric motor 42 is electrically powered by the electric generator 16 when the electric generator 16 is driven by manual rotation of the actuating element 14. The electric motor 42 is arranged to rotate the holder 38 from a released position to a holding position, e.g. upon on a granted authorization request. The authorization procedure may be handled by means of reading electronics (e.g. for wireless reading of credentials) and evaluation electronics in the lock device 10, as known in the art.

The release mechanism 40 of this example comprises a release member 44, here exemplified as a rigid body. The release member 44 is arranged to reciprocate linearly relative to the actuating element 14 and the spindle 30 in a direction perpendicular to the actuating axis 20 and in response to manual actuation of the actuating element 14 relative to the locking member 22. To this end, the release member 44 is arranged to travel in a track in the spindle 30.

When the actuating element 14 and the spindle 30 rotate about the actuating axis 20 relative to the locking member 22, the release member 44 rotates about the actuating axis 20 but also moves perpendicular to the actuating axis 20. When the actuating element 14, the spindle 30 and the locking member 22 rotate in common about the actuating axis 20, the release member 44 rotates about the actuating axis 20 but does not move perpendicular to the actuating axis 20.

Figure 3:
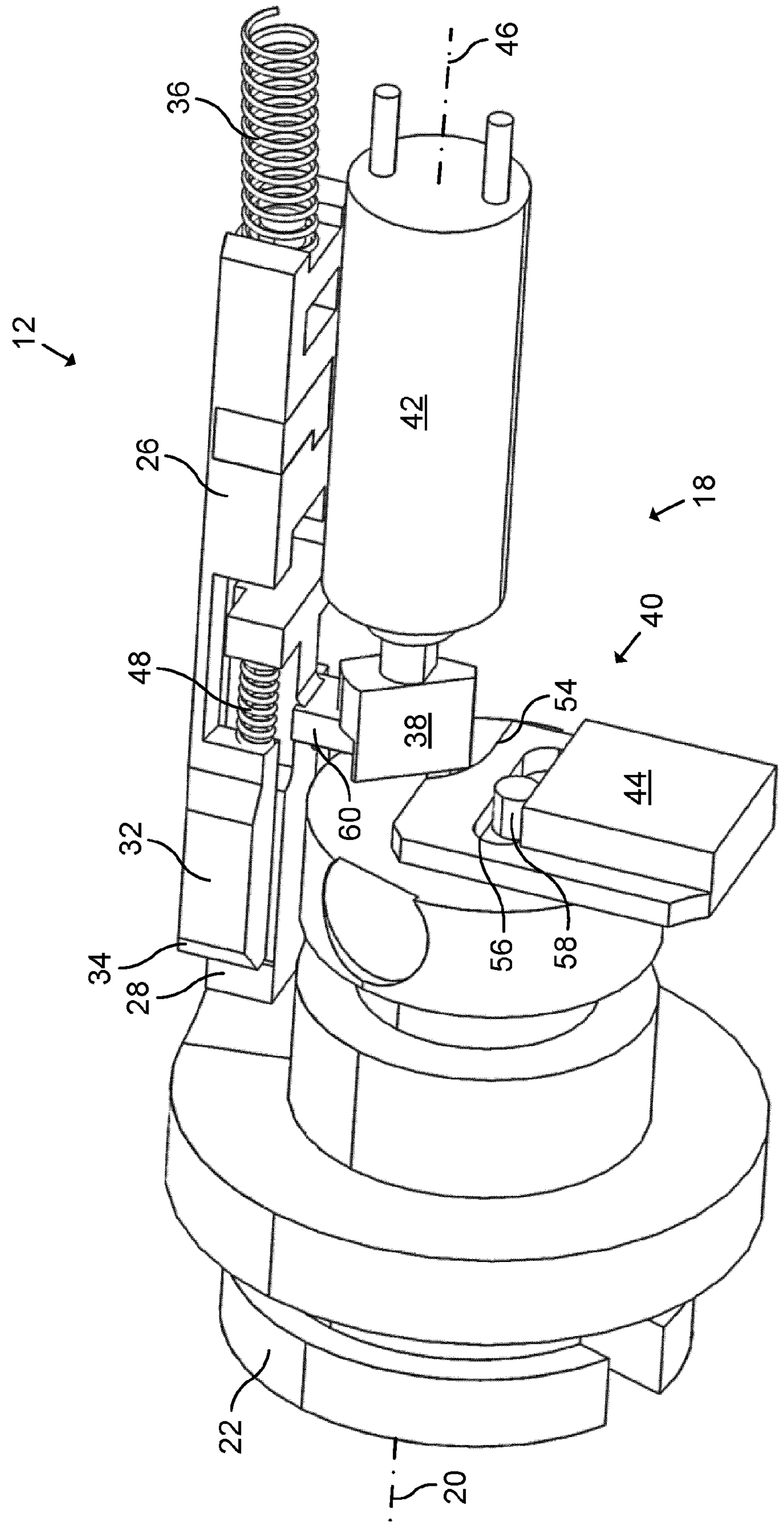
FIG. 3: schematically represents a perspective side view of the actuating device with a coupling device in a coupled state and a holder in a holding position.
Figure 4:
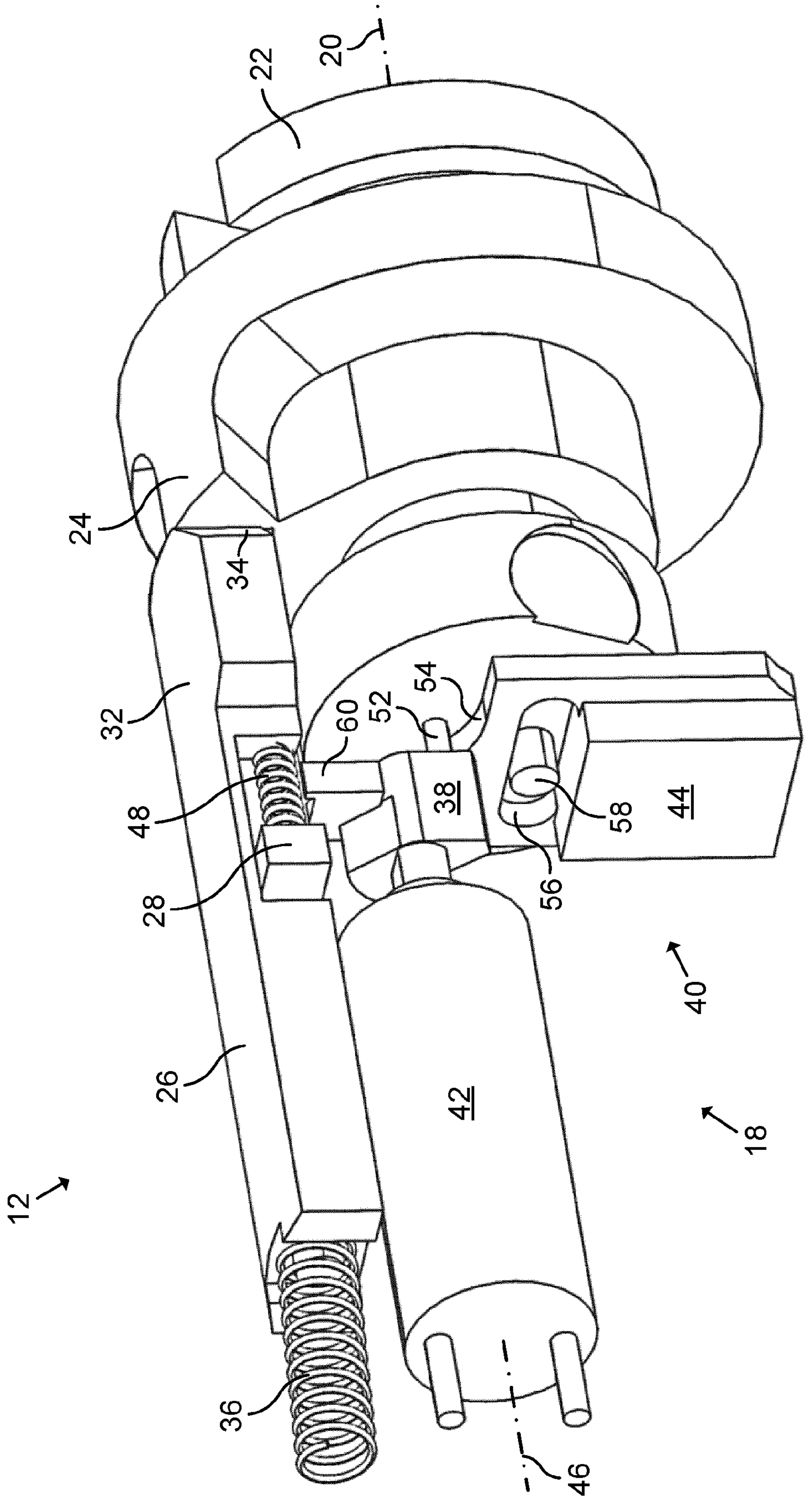
FIG. 4: schematically represents a further perspective side view of the actuating device in FIG. 3.

FIG. 3 schematically represents a perspective side view of the actuating device 12 when the coupling device 18 is in the coupled state and the holder 38 is in the holding position. FIG. 4 schematically represents a further perspective side view of the actuating device 12 in FIG. 3. In FIGS. 3 and 4, the spindle 30 and the actuating element 14 are removed to improve visibility. With collective reference to FIGS. 3 and 4, the electric motor 42 is arranged to rotate the holder 38 about a motor axis 46 parallel with the actuating axis 20.

The actuating device 12 further comprises a blocking member force device, here exemplified as two springs 48. Each spring 48 is connected between the blocking member 28 and the guiding member 32. The blocking member 28 and the guiding member 32 are allowed to move relative to each other against the deformation of the springs 48. The blocking member 28 is guided in a slot in the guiding member 32.

The blocking member 28 comprises an engageable structure, here exemplified as a protruding block 50. In the holding position, here in a first rotational position of the holder 38 about the motor axis 46, the holder 38 holds the blocker 26. In this specific example, the holder 38 holds the block 50 of the blocking member 28 such that the blocking member 28 is prevented from being retracted.

The holder 38 comprises an eccentric holder part, here exemplified as an eccentric holder pin 52. The holder pin 52 is eccentric with respect to the motor axis 46. The holder pin 52 is arranged to be engaged by the release mechanism 40.

The release member 44 comprises a cam surface 54. The cam surface 54 is arranged to engage the holder pin 52. The release member 44 further comprises a slot 56. The slot 56 of this example is elongated and perpendicular to the actuating axis 20.

The locking member 22 comprises an eccentric locking member part, here exemplified as a locking member pin 58. The locking member pin 58 is eccentric with respect to the actuating axis 20. The locking member pin 58 is received and engaged in the slot 56.

When the lock device 10 is unlocked, the coupling device 18 adopts the coupled state by moving the holder 38 to the holding position by the electric motor 42. In this case, rotation of the actuating element 14 about the actuating axis 20 is transmitted by the blocker 26 to a rotation of the locking member 22 about the actuating axis 20. In this example, rotation of the actuating element 14 is transmitted by the blocking member 28 to a rotation of the locking member 22. The actuating element 14, the release mechanism 40 and the locking member 22 rotate in common about the actuating axis 20. Therefore, the engagement of the locking member pin 58 in the slot 56 does not cause the release member 44 to move relative to the locking member 22 or the actuating element 14.

When the locking member 22 has been rotated to an unlocked position by means of the actuating element 14 to unlock the lock device 10, a door (or other access member) can be opened. The holder 38 may then be commanded to move from the holding position to the released position by means of the electric motor 42 after a certain time. In order to lock the lock device 10, for example when leaving a building, the user again presents his/her credentials and the holder 38 is commanded (upon valid authorization) to move the holder 38 from the released position to the holding position by means of the electric motor 42. The user then rotates the locking member 22 to a locked position by manual rotation of the actuating element 14 in a locking direction to lock the lock device 10.

After a certain time, the holder 38 is then again commanded to move from the holding position to the released position by means of the electric motor 42 in order to lock the lock device 10. However, the blocking member 28 may remain in contact with the protrusion 24 (as illustrated in FIGS. 3 and 4) such that the blocking member 28 and the holder 38 are under tension. In this case, the electric motor 42 may not be capable of bringing the holder 38 from the holding position to the released position by means of the electric motor 42 even though commanded to do so while electric energy is available.

However, when the actuating element 14 is manually rotated in an unlocking direction, the blocker 26 will move away from the protrusion 24 and the release mechanism 40 will mechanically force the holder 38 from the holding position to the released position. In this example, rotation of the actuating element 14 will cause the the release member 44 to travel radially inwards (with respect to the actuating axis 20) by means of the engagement of the slot 56 by the locking member pin 58. This movement of the release member 44 will cause the holder pin 52 to be pushed such that the holder 38 rotates from the holding position to the released position by means of the engagement between the cam surface 54 and the holder pin 52. The release mechanism 40 is thus arranged to mechanically force the holder 38 from the holding position to the released position by manual rotation of the actuating element 14 about the actuating axis 20.

Figure 5:
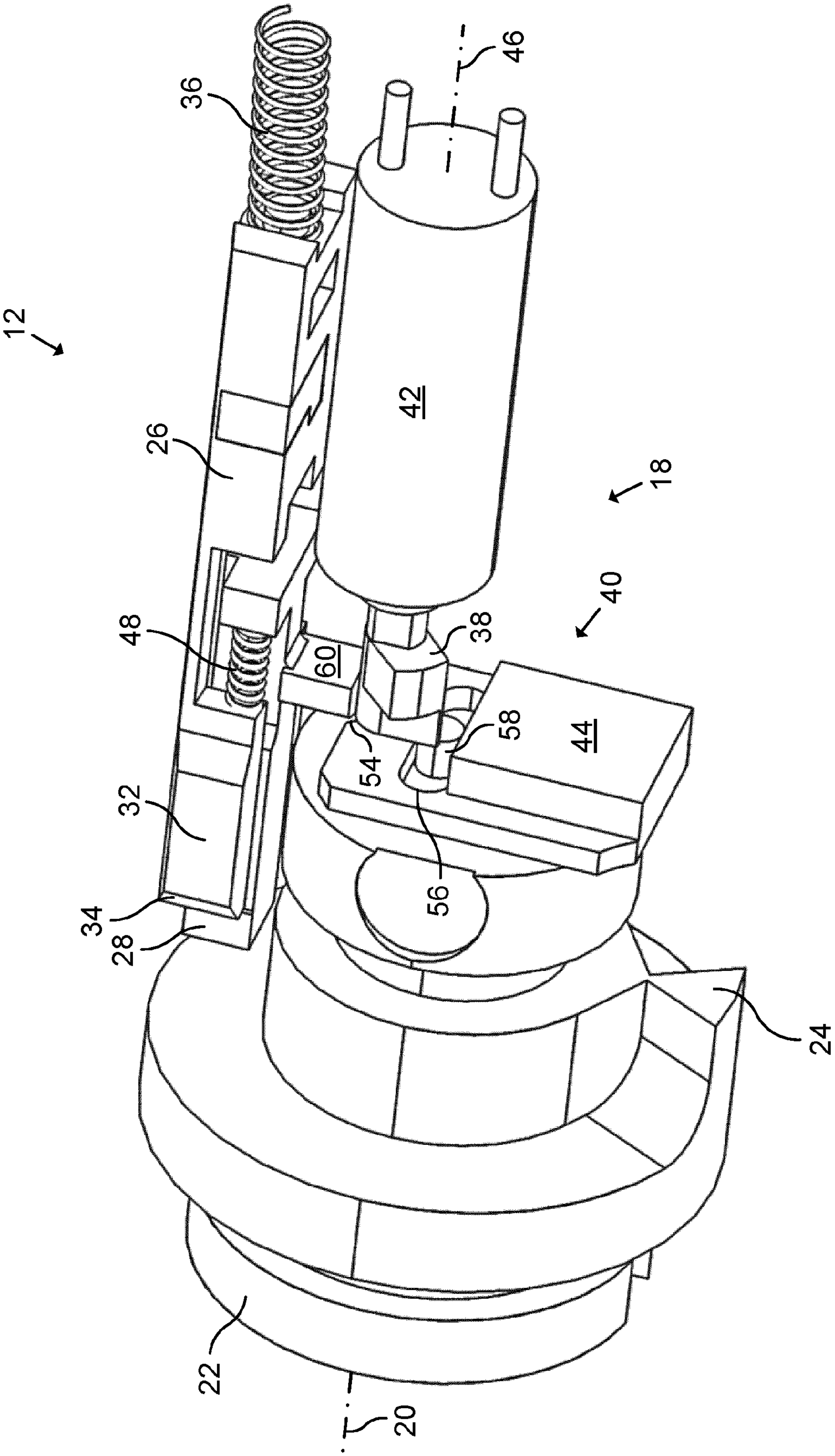
FIG. 5: schematically represents a perspective side view of the actuating device with the coupling device in a decoupled state and the holder in a released position.
Figure 6:
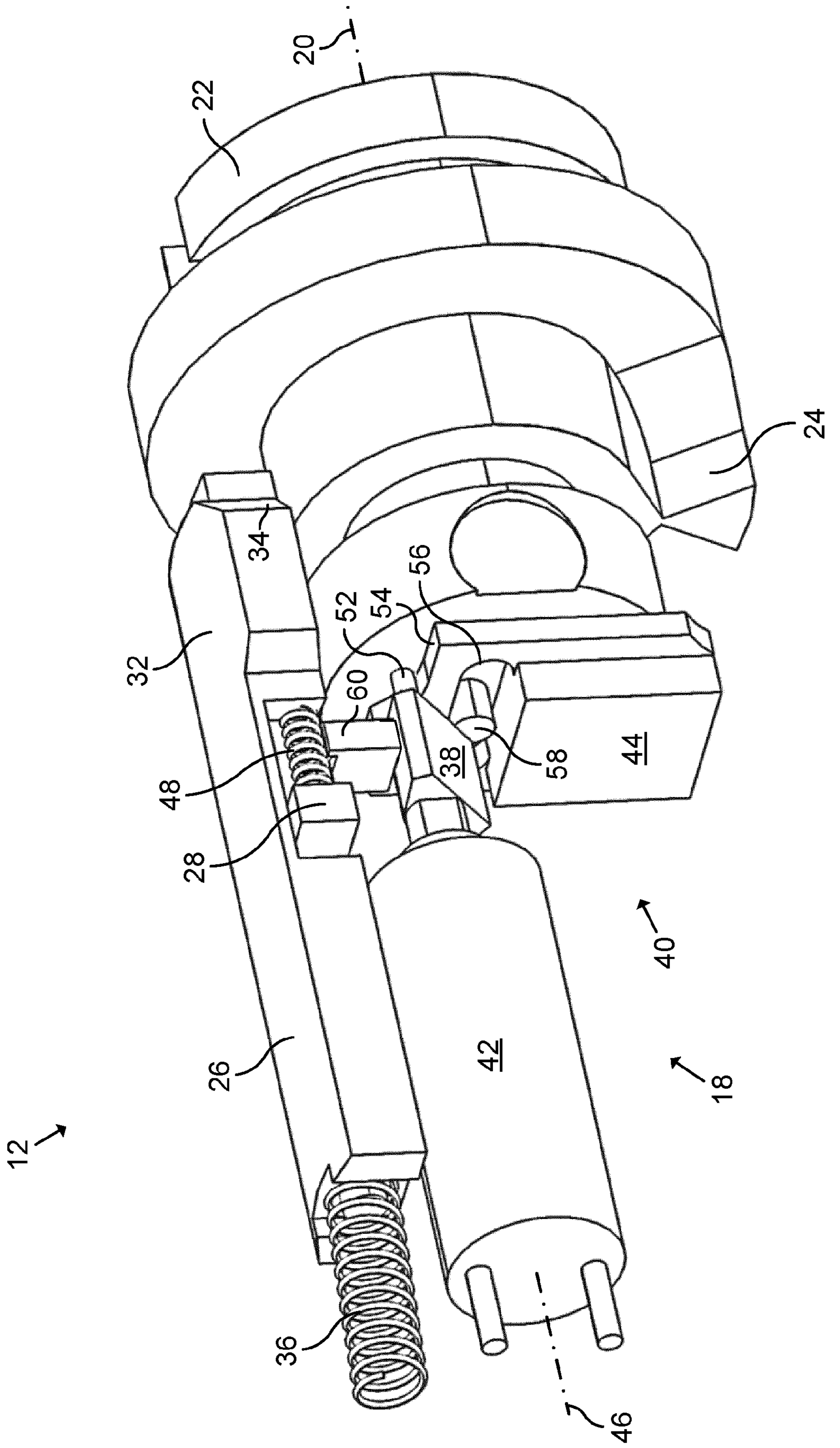
FIG. 6: schematically represents a further perspective side view of the actuating device in FIG. 5.

FIG. 5 schematically represents a perspective side view of the actuating device 12 with the coupling device 18 in the decoupled state and the holder 38 in the released position. FIG. 6 schematically represents a further perspective side view of the actuating device 12 in FIG. 5. With collective reference to FIGS. 5 and 6, when the holder 38 adopts the released position, i.e. a second rotational position about the motor axis 46, the holder 38 does not hold the blocking member 28. The lock device 10 is thereby locked in FIGS. 5 and 6.

When the actuating element 14 is rotated with the coupling device 18 in the decoupled state such that the blocker 26 contacts the protrusion 24, one of the guide surfaces 34 will initially contact the protrusion 24 such that the guiding member 32 is retracted against the compression of the spring 36. The retraction of the guiding member 32 will cause the springs 48 to be compressed such that also the blocking member 28 is retracted and thereby prevented from pushing the protrusion 24. Thus, rotation of the actuating element 14 will not be transmitted to a rotation of the locking member 22 and the lock device 10 is thereby locked.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. An actuating device for a lock device, the actuating device comprising:
- an actuating element manually rotatable about an actuating axis;
- an electric generator arranged to be driven by manual rotation of the actuating element about the actuating axis; and
- an electromechanical coupling device arranged to be electrically powered by the electric generator, the coupling device being configured to adopt a decoupled state, for decoupling the actuating element from a locking member, and a coupled state, for coupling the actuating element to the locking member;
- wherein the coupling device comprises a blocker, a holder and a release mechanism;
- wherein the holder is arranged to adopt a holding position, in which the holder holds the blocker, when the coupling device adopts the coupled state;
- wherein the holder is arranged to adopt a released position, in which the holder does not hold the blocker, when the coupling device adopts the decoupled state; and
- wherein the release mechanism is arranged to mechanically force the holder from the holding position to the released position by manual rotation of the actuating element about the actuating axis.

2. The actuating device according to claim 1, wherein the coupling device comprises an electric motor arranged to be electrically powered by the electric generator, and wherein the electric motor is arranged to drive the holder from the released position to the holding position.

3. The actuating device according to claim 2, wherein the holder is rotatable between the holding position and the released position about a motor axis of the electric motor, substantially parallel with the actuating axis.

4. The actuating device according to claim 3, wherein the holder comprises an eccentric holder part, eccentric with respect to the motor axis and arranged to be engaged by the release mechanism.

5. The actuating device according to claim 1, wherein the release mechanism comprises a release member arranged to push the holder from the holding position to the released position by manual rotation of the actuating element about the actuating axis.

6. The actuating device according to claim 4, wherein the release member comprises a cam surface arranged to engage the eccentric holder part.

7. The actuating device according to claim 5, wherein the release member is arranged to reciprocate linearly with respect to the actuating element and substantially perpendicularly to the actuating axis, in response to manual rotation of the actuating element about the actuating axis.

8. The actuating device according to claim 7, wherein the release member comprises a slot arranged to be engaged by an eccentric locking member part of the locking member, eccentric with respect to the actuating axis.

9. The actuating device according to claim 1, wherein the blocker comprises a blocking member.

10. The actuating device according to claim 9, wherein the blocking member is arranged to adopt an engaged position when the coupling device adopts the coupled state, wherein the blocking member is allowed to move from the engaged position to a disengaged position, substantially parallel with the actuating axis, when the coupling device adopts the decoupled state, and wherein the coupling device further comprises a blocker force device arranged to force the blocking member from the disengaged position towards the engaged position.

11. The actuating device according to claim 9, wherein the blocker further comprises a guiding member having two guide surfaces, wherein the blocking member is arranged between the guide surfaces, and wherein the guiding member is allowed to move, substantially parallel with the actuating axis, in response to manual rotation of the actuating element about the actuating axis, regardless of whether the coupling device adopts the coupled state or the decoupled state.

12. The actuating device according to claim 11, further comprising a blocking member force device arranged to force the blocking member relative to the guiding member.

13. A lock device comprising an actuating device according to claim 1.

14. The lock device according to claim 13, further comprising the locking member, wherein the locking member can be moved from a locked position to an unlocked position by means of manual rotation of the actuating element about the actuating axis when the coupling device adopts the coupled state, and wherein the locking member cannot be moved from the locked position to the unlocked position by means of manual rotation of the actuating element about the actuating axis when the coupling device adopts the decoupled state.

15. The lock device according to claim 14, wherein the locking member comprises an engageable structure arranged to be engaged by the blocker by manual rotation of the actuating element about the actuating axis.

* * * * *